(12) United States Patent
Choi

(10) Patent No.: US 8,750,846 B2
(45) Date of Patent: Jun. 10, 2014

(54) APPARATUS AND METHOD FOR CONTROLLING AN INCOMING CALL IN A MOBILE COMMUNICATION SYSTEM

(75) Inventor: Soo Deok Choi, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 454 days.

(21) Appl. No.: 12/652,474

(22) Filed: Jan. 5, 2010

(65) Prior Publication Data
US 2010/0173611 A1 Jul. 8, 2010

(30) Foreign Application Priority Data

Jan. 5, 2009 (KR) ........................ 10-2009-0000278

(51) Int. Cl.
| | | |
|---|---|---|
| H04W 4/16 | (2009.01) | |
| H04W 8/22 | (2009.01) | |
| H04W 4/02 | (2009.01) | |
| H04M 3/42 | (2006.01) | |
| H04M 3/00 | (2006.01) | |
| H04M 3/54 | (2006.01) | |
| H04M 1/64 | (2006.01) | |
| H04M 1/66 | (2006.01) | |
| H04M 11/00 | (2006.01) | |
| H04M 15/06 | (2006.01) | |
| H04M 3/436 | (2006.01) | |
| H04M 1/663 | (2006.01) | |

(52) U.S. Cl.
USPC ........ 455/415; 455/414.1; 455/417; 455/418; 455/515; 455/565; 455/567; 379/88.19; 379/88.2; 379/88.21; 379/100.05; 379/142.1; 379/189; 379/196; 379/199; 379/210.02; 379/210.03

(58) Field of Classification Search
CPC ........... H04M 3/42; H04M 3/00; H04M 1/64; H04M 1/66; H04M 15/06; H04M 3/38; H04M 1/663; H04M 3/42059; H04M 3/2281; H04M 3/54; H04B 7/00; H04B 1/38; H04W 4/16; H04W 8/22; H04W 4/02; G06F 13/107
USPC ........ 455/435.1, 456.3, 456.4, 515, 523, 565, 455/567, 414.1, 417–418; 370/328–329, 370/331; 379/188–189, 196, 199, 210.01, 379/210.02, 212.01, 221.01, 224.14
See application file for complete search history.

(56) References Cited

U.S. PATENT DOCUMENTS

| | | | | |
|---|---|---|---|---|
| 6,356,755 | B1 * | 3/2002 | Valentine et al. .......... | 455/435.1 |
| 7,623,849 | B2 * | 11/2009 | Zellner ....................... | 455/415 |
| 2005/0282559 | A1 | 12/2005 | Erskine et al. .............. | 455/456.4 |
| 2010/0041398 | A1 | 2/2010 | Sand et al. .................. | 455/433 |
| 2010/0197294 | A1 * | 8/2010 | Fox et al. .................... | 455/422.1 |
| 2012/0014380 | A1 * | 1/2012 | Wu .............................. | 370/352 |

* cited by examiner

*Primary Examiner* — Inder Mehra
(74) *Attorney, Agent, or Firm* — The Farrell Law Firm, P.C.

(57) ABSTRACT

An apparatus and method for controlling an incoming call to an incoming call subscriber terminal of a mobile communication system. A Mobility Management Entity (MME) receives the incoming call for the incoming call subscriber terminal from an outgoing call terminal, analyzes a type of the incoming call subscriber to determine whether a call restriction is required for incoming calls to the incoming call subscriber terminal, determines whether an outgoing call number of the outgoing call terminal is one of previously registered call-allowed numbers, if the call restriction is required; and pages the incoming call subscriber terminal, if the outgoing call number is one of the previously registered call-allowed numbers.

12 Claims, 6 Drawing Sheets

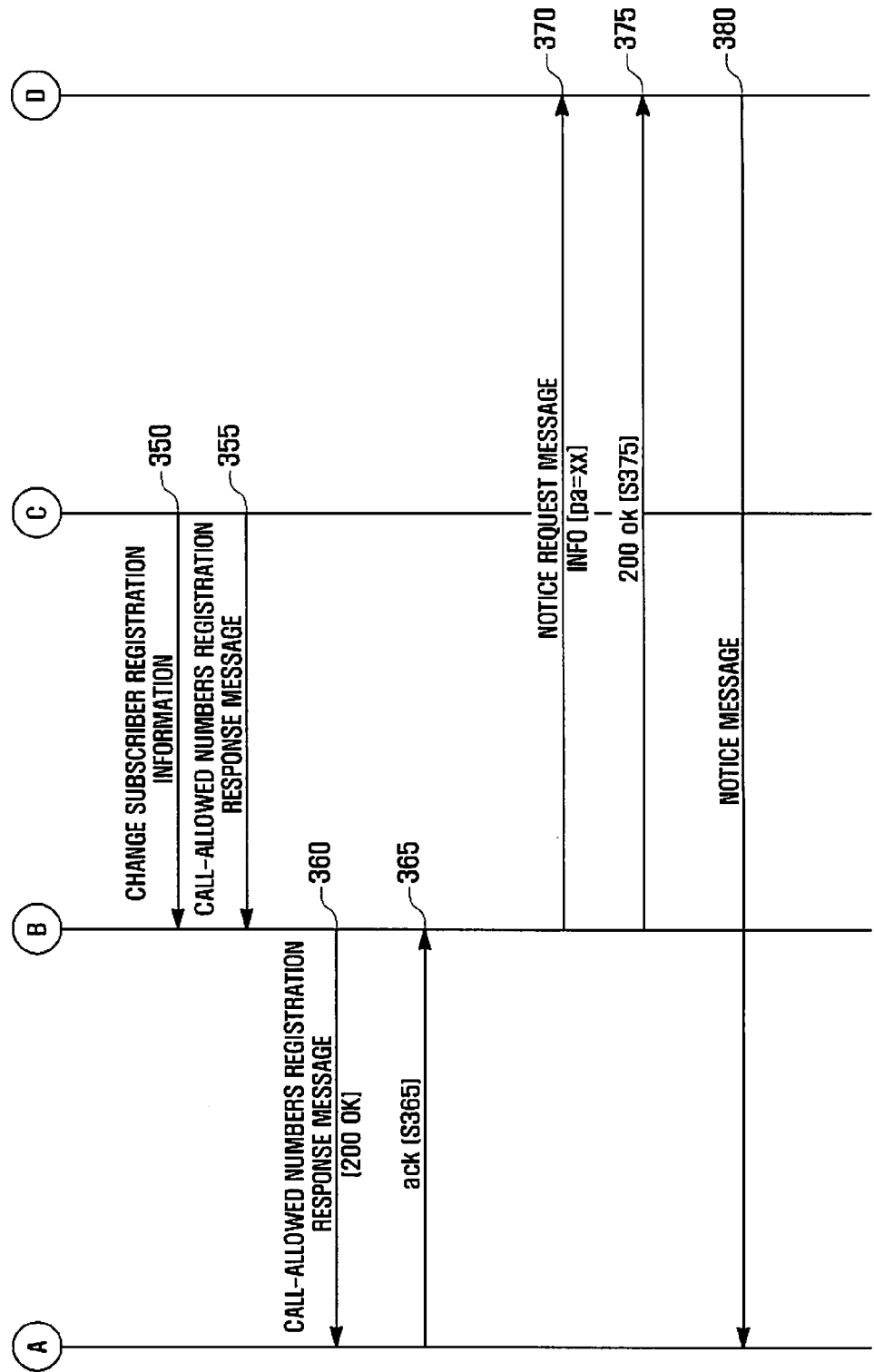

APPARATUS AND METHOD FOR CONTROLLING AN INCOMING CALL IN A MOBILE COMMUNICATION SYSTEM

PRIORITY

This application claims priority to an application filed in the Korean Intellectual Property Office on Jan. 5, 2009 and assigned Serial No. 10-2009-0000278, the content of which is incorporated herein by reference.

BACKGROUND OF THE INVENTION

1. Field of the Invention

The present invention relates generally to a method and apparatus for controlling an incoming call in a mobile communication system, and more particularly, to a method and apparatus that analyze a type of an incoming call subscriber and allow an incoming call from an outgoing call subscriber who is authorized to transmit a call.

2. Description of the Related Art

A wireless mobile network can be used to enable a user access to another specific service. For example, a remote monitoring system can be established using a video terminal for taking video, which is accessible through the wireless mobile network. The video terminal may include a monitoring sensor that is installed in an arbitrary space and generates a control signal while a movement is sensed. Additionally, the video terminal captures video data of the arbitrary space in a memory in response to the control signal, and transmits the video data to a reception unit through the mobile communication network.

Accordingly, the remote monitoring system can provide a user in a remote place the ability to monitor a certain space by combining wireless mobility of a wireless terminal and a video terminal connected through a wireless mobile network. That is, the user can view the video captured by the video terminal, which is transmitted through the wireless mobile network to the wireless terminal of the user.

However, when such a special service is to be provided, an existing call flow needs to be controlled because any subscriber registered in a network can use a mobile network. That is, an outgoing caller capable of transmitting a call to a video terminal, in order to view video captured by the video terminal, should be limited to select individuals. However, if any outgoing caller can transmit a call, for example, knows the connection number to the video terminal, the security of the remote monitoring system may be compromised.

Accordingly, when implementing a service that integrates a wireless mobile network and a specific service, there is a need for controlling who can call to use the specific service.

SUMMARY OF THE INVENTION

The present invention is made in view of at least the above problems, and provides a method and apparatus for analyzing a type of an incoming call subscriber when an outgoing call subscriber attempts to transmit a call to the incoming call subscriber, and enabling an incoming call from outgoing call subscribers that are permitted to transmit the incoming call, if the incoming call subscriber is registered in a specific service.

In addition, the present invention provides a call flow in which an incoming call subscriber registers call-allowed numbers for a specific service, and checks the registered call-allowed numbers.

In accordance with an aspect of the present invention, a method of controlling a call of a Mobility Management Entity (MME) in a mobile communication system includes analyzing a type of an incoming call subscriber; determining whether a call restriction is necessary when a call is generated by an outgoing call subscriber; determining whether an outgoing call number of the outgoing call subscriber is a previously registered call-allowed number, if the call restriction is necessary; and paging the incoming call subscriber through an evolved node B, if the outgoing call number is a call-allowed number.

In accordance with another aspect of the present invention, a system for controlling a call of a mobile communication system includes an outgoing call subscriber terminal that generates a call; an evolved node B that receives the call generated by the outgoing call subscriber terminal, transmits the received call to a mobility management entity, and pages the outgoing call subscriber terminal, if paging is requested; and a mobility management entity that analyzes a type of an incoming call subscriber and determines whether the outgoing call number of the outgoing call subscriber is a previously registered call-allowed number, when the call is generated, and pages the incoming call subscriber through the evolved node B, when the outgoing call number is a call-allowed number.

BRIEF DESCRIPTION OF THE DRAWINGS

The above and other aspects, features, and advantages of certain embodiments of the present invention will be more apparent from the following description taken in conjunction with the accompanying drawings, in which:

FIGS. 3A and 3B are flowcharts illustrating a process for registering call-allowed numbers for a specific service according to an embodiment of the present invention;

DETAILED DESCRIPTION OF EMBODIMENTS OF THE INVENTION

Certain embodiments of the present invention are described in detail below with reference to the accompanying drawings. The same reference numbers are used throughout the drawings to refer to the same or like parts. Detailed descriptions of well-known functions and structures incorporated herein may be omitted to avoid obscuring the subject matter of the present invention.

It is to be understood that the following disclosure is provided for explanation purposes only and is not intended as a limitation of the present invention.

Herein, "specific service" refers to a service, excluding a mobile communication service, which is provided in combination with a function block such as a camera, a sensor, a fire detector, and a security detector, through which a terminal is used for special purpose like a remote monitoring system, a personal security system, and an IP video monitoring system based on, e.g., wireless Local Area Network (LAN).

Herein, "an incoming call subscriber terminal" refers to terminal of user that is registered for a specific service. Additionally, "an outgoing call subscriber terminal" refers to a terminal of a user that transmits a call to the incoming call subscriber terminal. Additionally, "a normal subscriber terminal" refers to a terminal of a user that is registered in an existing mobile communication service, without registering for the specific service.

The embodiments of the present invention described below will be explained using an Evolved Packet System (EPS) core network, which is an evolved core network, based on the 3$^{rd}$ Generation Partnership Project (3GPP), merely by way of example. Accordingly, the present invention can be applied to any mobile communication network that operates in a similar manner.

Figure 1:
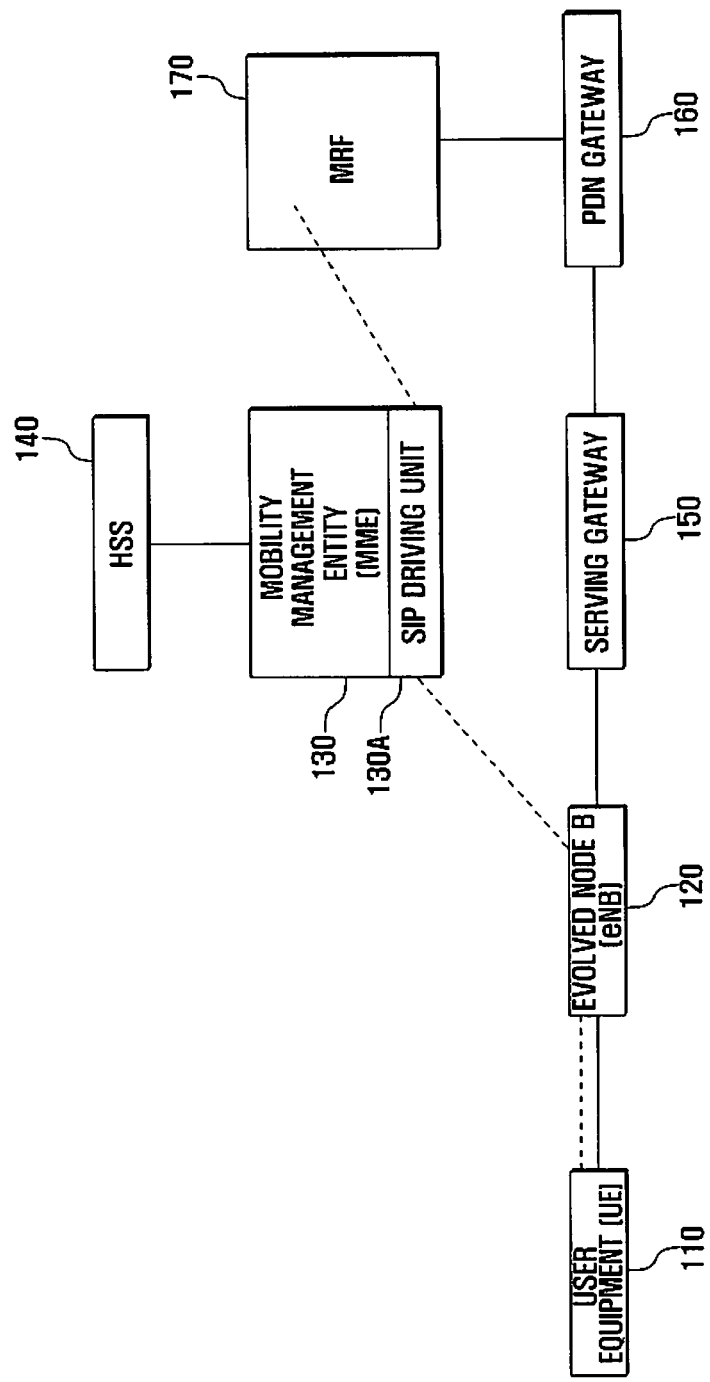
FIG. 1 illustrates an evolved packet system (EPS) according to an embodiment of the present invention.

FIG. 1 illustrates an EPS system according to an embodiment of the present invention.

Referring to FIG. 1, the EPS system includes a User Equipment (UE) 110, an Evolved Node B (ENB) 120, a Mobility Management Entity (MME) 130, a Home Subscriber Server (HSS) 140, a serving gateway 150, a Packet Data Network (PDN) gateway 160, and a Media Resource Function (MRF) 170.

The UE 110, e.g., a mobile terminal, is connected to the ENB 120 through a wireless channel, transmits a request for voice service, a Short Message Service (SMS), a packet data service, etc., and receives a corresponding service response. In accordance with an embodiment of the present invention, the user equipment 110 may be a terminal of an incoming call subscriber or a terminal of an outgoing call subscriber. Herein, an incoming call subscriber terminal refers to a terminal of a user that is registered for a specific service, such as a remote monitoring system, and an outgoing call subscriber terminal is a terminal of a user that transmits a call to the incoming call subscriber terminal, as explained above.

The ENB 120, e.g., a base station, performs a wireless resource management function related with radio bearer control, connection mobility control, uplink/downlink resource distribution, scheduling, etc. In other words, the ENB 120 is positioned between a terminal and a core, and distributes a control signal and a bearer signal generated in the UE 110 to the MME 130 and the serving gateway 150. Additionally, the ENB 120 transmits a signal generated by the MME 130 to the UE 110.

The MME 130 manages a terminal in idle mode, and selects the PDN gateway 160 and the serving gateway 150. Basically, the MME 130 performs functions related with roaming and authentication.

Further, in accordance with an embodiment of the present invention, the MME 130 analyzes a type of an incoming call subscriber terminal, i.e., determines if the incoming call subscriber terminal is registered for a specific service, when a call is transmitted from an outgoing call subscriber terminal (via the ENB 120).

Additionally, the MME 130 provides a call flow that enables a call only from an outgoing call subscriber terminal that is authorized to transmit a call, when the incoming call subscriber terminal is registered for a specific service.

Additionally, in accordance with an embodiment of the present invention, the MME 130 controls a MRF 170 to provide an announcement broadcast to an outgoing call subscriber terminal that transmits a call.

The MME 130 includes a Session Initiation Protocol (SIP) driving unit 130A. The SIP driving unit 130A controls an SIP communication procedure between the MME 130 and the UE 110, when an incoming call subscriber terminal desires to register call-allowed numbers or check previously registered call-allowed numbers. The SIP driving unit 130A communicates with the MRF 170 by SIP in order to provide a call connection announcement broadcast or a call prohibition announcement broadcast to a subscriber.

The HSS 140 stores and manages information about an outgoing call subscriber terminal and an incoming call subscriber terminal. In accordance with an embodiment of the present invention, the HSS 140 classifies an incoming call subscriber terminal according to a registered service type, and stores the classified incoming call subscriber terminal. This procedure will be described later in more detail with reference to FIG. 2.

The serving gateway 150 works as a mobility anchor in the handover between ENBs 120 or in the movement between 3GPP wireless networks. The serving gateway 150 processes a bearer signal generated in the UE 110.

The PDN gateway 160 allocates an Internet Protocol (IP) address of the UE 110, performs a function related with packet data of a core network, and works as a mobility anchor in the movement between a 3GPP wireless network and a non-3GPP wireless network. Also, the PDN gateway 160 determines a bearer band provided to a subscriber, and performs forwarding and routing functions for packet data.

The MRF 170 receives a request to provide an announcement broadcast from the MME 130, and provides a call connection announcement broadcast, a call prohibition announcement broadcast, and a call-allowed numbers registration announcement broadcast to an outgoing call subscriber or an incoming call subscriber. For example, the broadcast may a voice signal, a text message, or a tone signal. The traffic of the broadcast is transmitted to the UE 110 via the MRF 170, the PDN gateway 160, the serving gateway 150 and the ENB 120.

Figure 2:
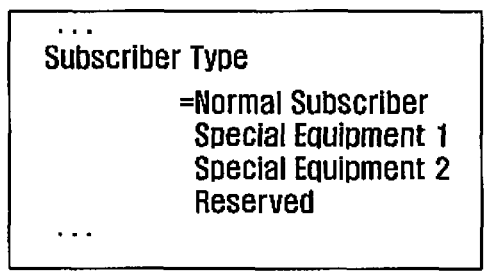
FIG. 2 illustrates subscriber information stored in a home subscriber server according to a type of an incoming call subscriber, according to an embodiment of the present invention.

FIG. 2 illustrates subscriber information stored in an HSS according to a type of an incoming call subscriber terminal, in accordance with an embodiment of the present invention.

When an incoming call subscriber terminal registers for a specific service, e.g., a remote monitoring system, information of the incoming call subscriber terminal is registered in an HSS in order to determine whether a general call control flow will be applied or a call control flow that enables only a call from call-allowed numbers will be applied to incoming calls to the incoming call subscriber terminal.

For example, the HSS 140 classifies types of an incoming call subscriber terminal into a normal subscriber, special equipment 1 (a first service incoming call subscriber) and special equipment 2 (a second service incoming call subscriber), and can store the classified types. A normal subscriber refers to a terminal that is registered in an existing mobile communication service without registering in a specific service. A special equipment 1 (a first service incoming call subscriber terminal) refers to a terminal of a user that enables only a call from previously registered call-allowed numbers. In accordance with an embodiment of the present invention, a first service is defined as a service that requires registration of call-allowed numbers. Accordingly, an incoming call subscriber terminal should separately register numbers of outgoing call subscriber terminals that are authorized to transmit a call to the incoming call subscriber terminal. The procedure of registering call-allowed numbers will be described later in more detail with reference to FIG. 3.

A special equipment 2 (a second service incoming call subscriber terminal) refers to a terminal of a user this is registered in a service, but enables a call to all outgoing call subscribers. In accordance with an embodiment of the present invention, a second service is defined as a service that does not require registration any call-allowed numbers. That is, any terminal may call and access the second service.

It is noted that the types of incoming call subscriber terminals illustrated in FIG. 2 are merely provided as an example, and the present invention is not limited to these examples.

Figure 3A:
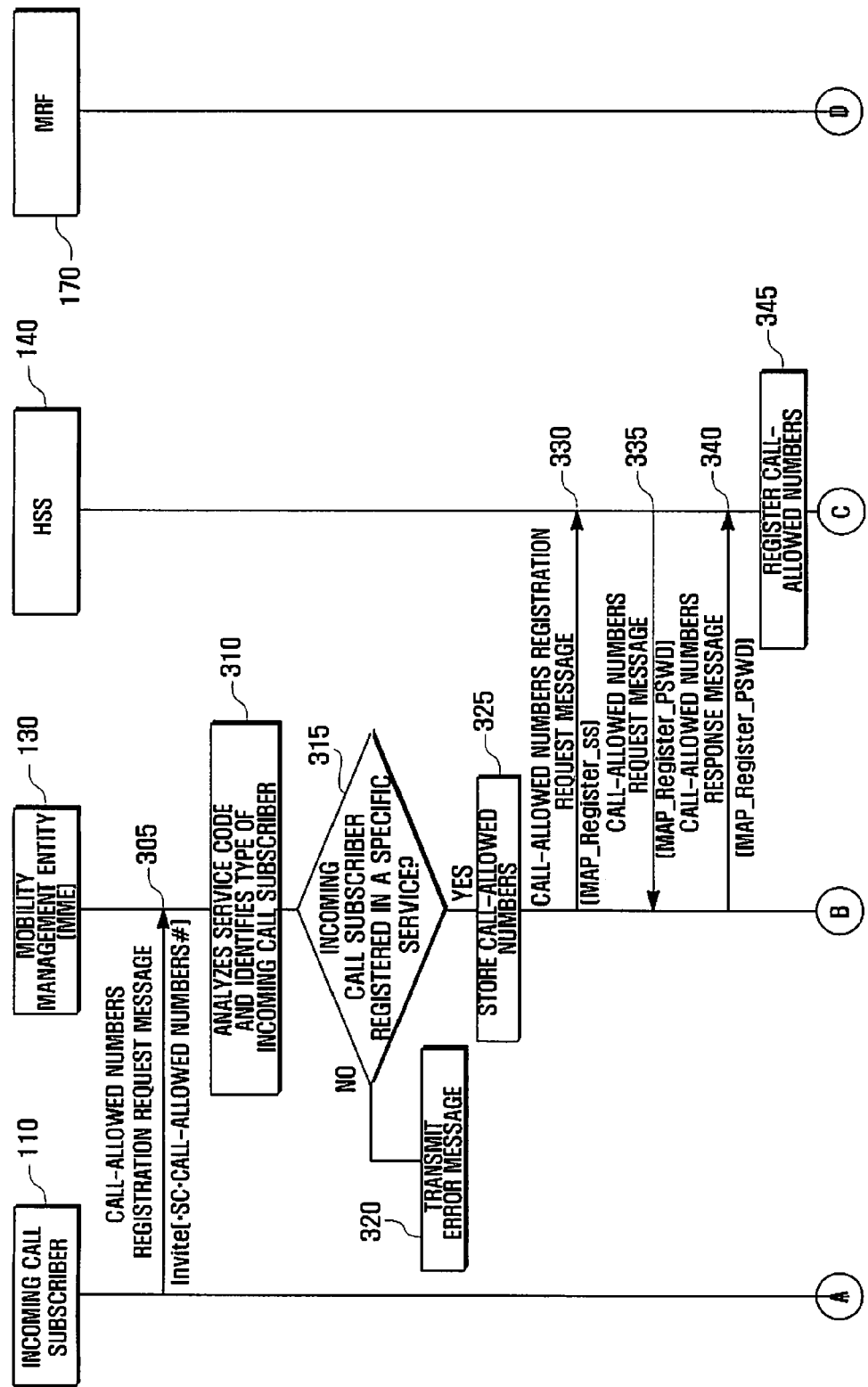

FIGS. 3A and 3B are flowcharts illustrating a process registering call-allowed numbers for a specific service according to an embodiment of the present invention.

More specifically, as described above, e.g., a remote monitoring system should only allow a call from a previously registered outgoing call subscriber terminal. Therefore, an incoming call subscriber terminal that is registered for the remote monitoring system should register outgoing call subscriber terminals that are allowed to transmit a call thereto.

Referring to FIG. 3A, in step 305, a UE 110, in this case, an incoming call subscriber terminal, transmits, to the MME 130, a message requesting to register call-allowed numbers for outgoing call subscriber terminals that are allowed to transmit a call to the incoming call subscriber terminal 110. According to an embodiment of the present invention, a message transmitted and received between the incoming call subscriber 110 and the MME 130 is transmitted and received using SIP protocol. Further, the message requesting registration of the call-allowed numbers includes a Service Code (SC) about registration of the call-allowed numbers and numbers of the outgoing call subscriber terminals that are allowed to transmit a call.

In step 310, the MME 130 receives the request message, and analyzes the SC therein. When the SC indicates registration of call-allowed numbers, the MME 130 analyzes the type of the incoming call subscriber terminal 110 that transmitted the message. The type of the incoming call subscriber terminal 110 is stored in an HSS 140. Accordingly, the MME 130 can identify the type of an incoming call subscriber terminal 110 through the HSS.

In step 315, the MME 130 determines whether the incoming call subscriber terminal 110 is registered in a specific service, e.g., the first service that requires registration of certain numbers. If the incoming call subscriber terminal 110 did not register for the first service, the MME 130 transmits an error message to the incoming call subscriber terminal 110 in step 320. However, if the incoming call subscriber terminal 110 has registered for the first service, the MME 130 checks call-allowed numbers, and stores the numbers in step 325.

More specifically, the MME 130 transmits a message (MAP_REGISTER_SS) requesting registration of call-allowed numbers to the HSS 140 in order to register the call-allowed numbers in the HSS 140 in step 330. The HSS 140 analyzes the SC of the received message, and confirms that the SC requires registration of the call-allowed numbers. Thereafter, in step 335, the HSS 140 transmits a message (MAP_REGISTER_PSWD), to the MME 130, requesting the call-allowed numbers to be registered.

In step 340, the MME 130 generates a call-allowed numbers response message (MAP_REGISTER_PSWD) including call-allowed numbers, and transmits the generated call-allowed numbers response message to the HSS 140.

The HSS 140 receives the call-allowed numbers response message, checks the call-allowed numbers, and registers the checked call-allowed numbers as call-allowed numbers for special equipment 1 in step 345.

Referring to FIG. 3B, in step 350, the MME 130 and the HSS 140 change registration information for the incoming call subscriber terminal 110. That is, the MME 130 and the HSS 140 update information about call-allowed numbers for the incoming call subscriber terminal 110.

In step 355, the HSS 140 transmits a call-allowed numbers registration response message (MAP_REGISTER_SS) to the MME 130, in response to the call-allowed numbers registration request message (MAP_REGISTER_SS).

In step 360, the MME 130 receives the message, and transmits a call-allowed numbers registration response message (200 ok) to the incoming call subscriber terminal 110. Then, the incoming call subscriber terminal 110 receives the message, and then transmits a confirmation message for the reception to the MME 130 in step 365.

According to an embodiment of the present invention, the MME 130 notifies the incoming call subscriber terminal 110 that call-allowed numbers were successfully registered.

To this end, in step 370, the MME 130 transmits, to the MRF 170, a notice request message (INFO[pa=xx]) for notifying the incoming call subscriber terminal 110 that call-allowed numbers were successfully registered. According to an embodiment of the present invention, the message transmitted and received between the MME 130 and the MRF 170 is transmitted and received using SIP.

For example, the notice may be an announcement broadcast, a text message, or a tone that notifies that call-allowed numbers were successfully registered.

The MRF 170 transmits a confirmation message for the reception to the MME 130 in step 375. In addition, the MRF 170 transmits a notice message to the incoming call subscriber terminal 110, notifying that call-allowed numbers were successfully registered in step 380.

Figure 4:
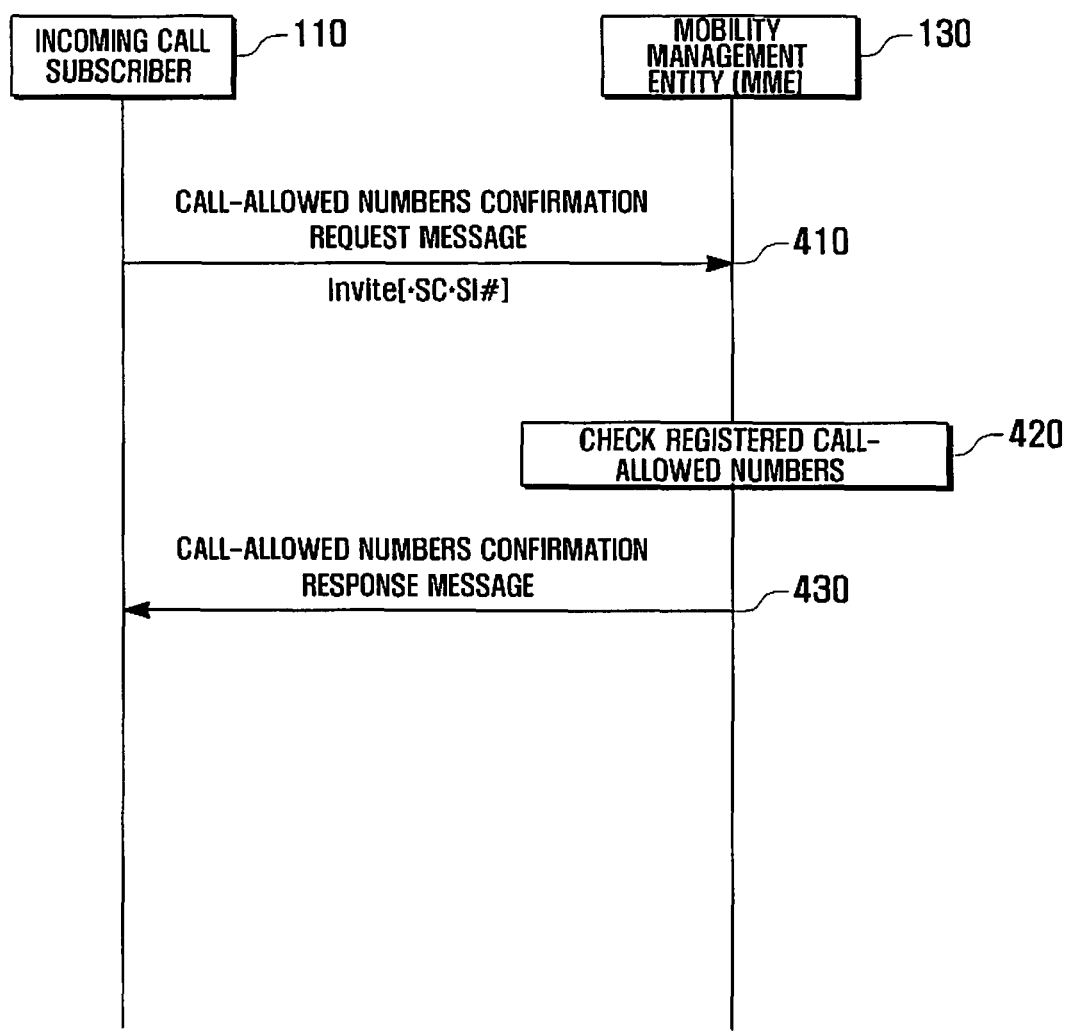
FIG. 4 illustrates a process for checking a list of registered call-allowed numbers, according to an embodiment of the present invention.

FIG. 4 illustrates a process for checking a list of registered call-allowed numbers, in accordance with an embodiment of the present invention.

Referring to FIG. 4, in step 410, the incoming call subscriber terminal 110 transmits a call-allowed numbers confirmation request message (INVITE[*SC*SI#]) to the MME 130 in order for the incoming call subscriber terminal 110 to check the list of call-allowed numbers previously registered.

According to an embodiment of the present invention, the message transmitted and received between the incoming call subscriber terminal 110 and the MME 130 is transmitted and received using SIP. Further, the call-allowed numbers confirmation request message may include a SC that requests confirmation of call-allowed numbers, and a Service Indicator (SI).

The MME 130 receives the call-allowed numbers confirmation request message, and analyzes the type of the incoming call subscriber terminal 110. The MME 130 checks the list of registered call-allowed numbers with reference to the profile of the incoming call subscriber terminal when the type of the incoming call subscriber is special equipment 1 (i.e., an incoming call subscriber terminal that registers call-allowed numbers). In step 430, the MME 130 transmits a call-allowed numbers confirmation response message (INFO"RESULT") including the call-allowed numbers list to the incoming call subscriber terminal 110.

Accordingly, the incoming call subscriber terminal 110 can then check the list of registered call-allowed numbers.

Figure 5:
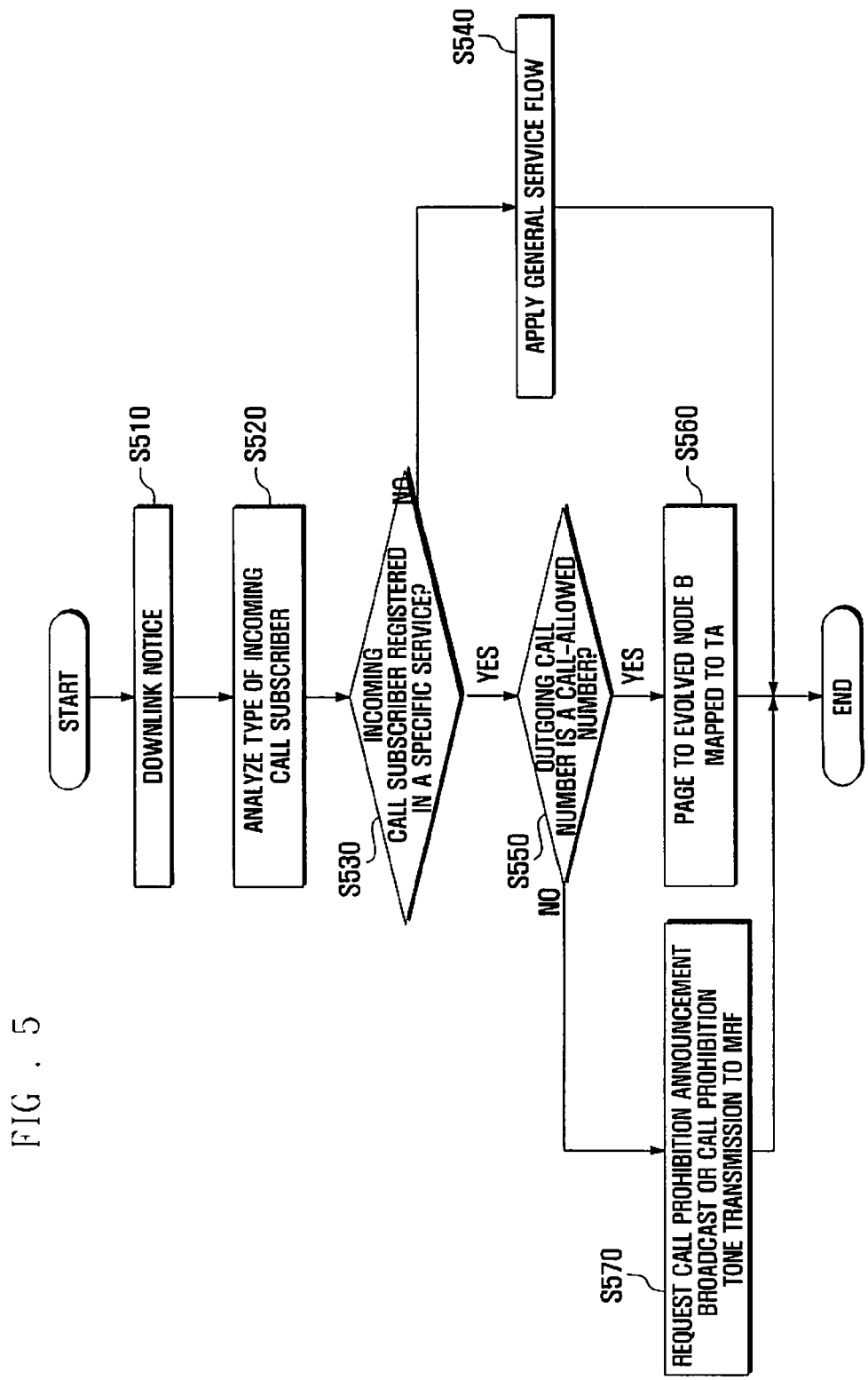
FIG. 5 is a flowchart illustrating a process for identifying an incoming call subscriber registered in a specific service, according to an embodiment of the present invention.

FIG. 5 is a flowchart illustrating a process for analyzing an incoming call to an incoming call subscriber terminal that has registered for a specific service, in accordance with an embodiment of the present invention.

Referring to FIG. 5, in step 510, when an incoming call subscriber terminal 110 has an incoming call, an MME 130 receives a downlink notification. In step 520, the MME 130 analyzes a type of the incoming call subscriber terminal 110. For example, the types of the incoming call subscriber terminal 110 can be classified into a normal subscriber, special equipment 1, and special equipment 2, as described above.

Again, a normal subscriber refers to a terminal of user that is registered in an existing mobile communication service, but not registered for a specific service, special equipment 1 refers to a terminal of a user that enables incoming calls from only previously registered outgoing call subscriber terminals, and special equipment 2 refers to a terminal of a user that is registered for a specific service, but allows incoming calls from all outgoing call subscriber terminals.

In step 540, the MME 130 applies a general incoming call flow when the type of the incoming call subscriber terminal 110 is determined as a normal subscriber in step 530. That is, the incoming call subscriber terminal 110 is paged through a corresponding evolved node B 120.

However, when the incoming call subscriber terminal 110 is registered for a specific service, the MME 130 checks whether the outing call number is a call-allowed number in step 550.

More specifically, the MME 130 includes a list of call-allowed numbers, which are allowed to place an incoming call to the incoming call subscriber terminal 110. Hence, the mobility management entity 130 can check whether an outgoing call number is a call-allowed number. When the outgoing call number is a call-allowed number, the mobility management entity 130 performs paging through an ENB 120 mapped to a Tracking Area (TA) in step 560. Of course, if the incoming call subscriber terminal 110 is registered as special equipment 2 for the specific service, step 550 may be skipped, as all outgoing call numbers are call-allowed numbers.

According to an embodiment of the present invention, the MME 130 pages the ENB 120, and, at the same time, transmits a call connection announcement broadcast to the outgoing call subscriber terminal through a MRF 170. Here, the announcement broadcast may be provided a voice signal, a text message, or a tone signal.

However, when the outgoing call number is not a call-allowed number, the MME 130 denies connection of the incoming call and may transmit a call prohibition announcement broadcast to the outgoing call subscriber terminal through the MRF 170 in step 570. Likewise, the announcement broadcast may be provided a voice signal, a text message, or a tone signal.

According to a method and system for controlling a call of the present invention, when an outgoing call subscriber terminal attempts to transmit an incoming call to an incoming call subscriber terminal, a type of the incoming call subscriber terminal is analyzed, and when it is determined that the incoming call subscriber terminal is registered for a specific service, the incoming call is allowed only from an outgoing call subscriber terminal that is registered as being allowed to call the incoming call subscriber terminal.

Accordingly, if a new service is created using mobility of a wireless terminal and additional functions of a terminal, a new business model of a core system, as well as a basic function of providing voice and data service between individuals can be created. Here, a newly generated end-to-end call control is performed in a core system, such that a consistent and secure service can be provided to a subscriber.

Although certain embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims and the equivalents thereof.

What is claimed is:

1. A method of controlling an incoming call to an incoming call subscriber terminal by a Mobility Management Entity (MME) of a mobile communication system, the method comprising:
    receiving, by the MME, the incoming call for the incoming call subscriber terminal from an outgoing call terminal;
    analyzing, by the MME, a type of the incoming call subscriber terminal to determine whether the incoming call subscriber terminal is a first service incoming call subscriber terminal that requires a call restriction for incoming calls;
    determining, by the MME, if the incoming call subscriber terminal is the first service incoming call subscriber terminal for which the call restriction is required, whether an outgoing call number of the outgoing call terminal is one of previously registered call-allowed numbers based on a list of call-allowed numbers which are allowed to place an incoming call to the incoming call subscriber terminal; and
    paging, by the MME, the incoming call subscriber terminal, if the outgoing call number is one of the previously registered call-allowed numbers.

2. The method of claim 1, wherein the type of the incoming call subscriber terminal includes one of a normal subscriber terminal that does not need the call restriction, the first service incoming call subscriber terminal that provides an additional service and requires the call restriction, and a second service incoming call subscriber terminal that provides the additional service but does not require the call restriction.

3. The method of claim 1, further comprising restricting, by the MME, the incoming call, if the outgoing call number is not one of the previously registered call-allowed numbers.

4. The method of claim 3, further comprising:
    transmitting, by the MME, a call prohibition announcement broadcast request message to the outgoing call terminal through a media resource function unit.

5. The method of claim 1, further comprising:
    transmitting, by the MME, a call announcement broadcast request message to the outgoing call terminal through a media resource function unit.

6. The method of claim 1, further comprising:
    receiving, by the MME, a call-allowed numbers registration request message from the incoming call subscriber terminal, requesting the MME to register the call-allowed numbers;
    registering, by the MME, the call-allowed numbers in a home subscriber server;
    transmitting, by the MME, a notice request message about the call-allowed numbers registration to a media resource function unit; and
    transmitting, by the media resource function unit, a notice message about the call-allowed numbers registration to the incoming call subscriber terminal.

7. The method of claim 1, further comprising:
    receiving, by the MME, a call-allowed numbers confirmation request message for checking the previously registered call-allowed numbers from the incoming call subscriber terminal;
    checking, by the MME, the previously registered call-allowed numbers for the incoming call subscriber terminal;
    generating, by the MME. a call-allowed numbers confirmation response message; and
    transmitting, by the MME, the generated call-allowed numbers confirmation response message to the incoming call subscriber terminal.

8. An apparatus for controlling an incoming call to an incoming call subscriber terminal of a mobile communication system, the apparatus comprising:
a Mobility Management Entity (MME) for receiving the incoming call for the incoming call subscriber terminal from an outgoing call terminal, analyzing a type of the incoming call subscriber terminal to determine whether the incoming call subscriber terminal is a first service incoming call subscriber terminal that requires a call restriction for incoming calls, determining whether an outgoing call number of the outgoing call terminal is one of previously registered call-allowed numbers based on a list of call-allowed numbers which are allowed to place an incoming call to the incoming call subscriber terminal, if the incoming call subscriber terminal is the first service incoming call subscriber terminal for which the call restriction is required; and paging the incoming call subscriber terminal, if the outgoing call number is one of the previously registered call-allowed numbers.

9. The apparatus of claim 8, further comprising a subscriber information server that stores the type of the incoming call subscriber terminal,
wherein the type of the incoming call subscriber terminal includes one of a normal subscriber terminal that does not need the call restriction, the first service incoming call subscriber terminal that provides an additional service and requires the call restriction, and a second service incoming call subscriber terminal that provides the additional service but does not require the call restriction.

10. The apparatus of claim 8, wherein the MME restricts the incoming call when the outgoing call number is not one of the call-allowed numbers.

11. The apparatus of clam 10, further comprising:
a media resource function unit that receives a call prohibition announcement broadcast request message from the MME, and transmits a call prohibition announcement broadcast to the outgoing call subscriber terminal, when the outgoing call number is not one of the call-allowed numbers.

12. The apparatus of claim 10, further comprising:
a media resource function that receives a call announcement broadcast request message from the MME, and transmits a call announcement broadcast to the outgoing call subscriber, if the outgoing call number is one of the previously registered call-allowed numbers.

* * * * *